United States Patent (10) Patent No.: US 10,457,423 B2
Lu et al. (45) Date of Patent: Oct. 29, 2019

(54) SYSTEM AND METHOD FOR AIRCRAFT FAILURE PREDICTION

(71) Applicant: The Boeing Company, Chicago, IL (US)

(72) Inventors: Tsai-Ching Lu, Thousand Oaks, CA (US); Rashmi Sundareswara, Topanga, CA (US); David Huber, Calabasas, CA (US); Alex Waagen, Agoura Hills, CA (US)

(73) Assignee: The Boeing Company, Chicago, IL (US)

( * ) Notice: Subject to any disclaimer, the term of this patent is extended or adjusted under 35 U.S.C. 154(b) by 66 days.

(21) Appl. No.: 15/712,530

(22) Filed: Sep. 22, 2017

(65) Prior Publication Data

US 2019/0092495 A1 Mar. 28, 2019

(51) Int. Cl.
B64F 5/40 (2017.01)
G06Q 10/06 (2012.01)
G06Q 10/00 (2012.01)
G07C 5/00 (2006.01)
B64F 5/60 (2017.01)

(52) U.S. Cl.
CPC .............. B64F 5/40 (2017.01); B64F 5/60 (2017.01); G06Q 10/06 (2013.01); G06Q 10/20 (2013.01); G07C 5/006 (2013.01)

(58) Field of Classification Search
CPC .. B64F 5/40; B64F 5/60; G06Q 10/20; G06Q 10/06; G07C 5/006
USPC ........................................................ 701/32.1
See application file for complete search history.

Primary Examiner — Brian P Sweeney
(74) Attorney, Agent, or Firm — Perman & Green, LLP

(57) ABSTRACT

An aircraft component failure prediction apparatus including a database and an aircraft maintenance controller coupled to the database. The controller classifies operational data, in a first classification, as corresponding with at least one maintenance message to form at least one classified multidimensional operation data matrix including classified data. The controller classifies the classified data of the at least one classified multidimensional data matrix, in a second classification, to predict an occurrence of a future maintenance message for the aircraft component. The controller preprocesses the at least one classified multidimensional operation data matrix, and generates an output of at least one partial dependency function that explains prediction of the occurrence of the future maintenance message.

20 Claims, 10 Drawing Sheets

| FLIGHT No. | TAIL No. | DATA | TEMP(°C) | VOLTAGE |
|---|---|---|---|---|
| 1 | ABC | 5/1/17 | 50 | 10 |
| 2 | DEF | 5/2/17 | 20 | 15 |
| 3 | GHI | 5/8/17 | 30 | 12 |
| 4 | JKL | 5/8/17 | 25 | 13 |
| 5 | JKL | 5/8/17 | 26 | 18 |

FIG.2

| FLIGHT No. | TAIL No. | DATA | MMSG |
|---|---|---|---|
| 1 | ABC | 5/1/17 | ---- |
| 2 | DEF | 5/2/17 | 12345 |
| 3 | GHI | 5/8/17 | 56789 |
| 4 | JKL | 5/8/17 | 56789 |
| 5 | JKL | 5/8/17 | 56789 |

| FLIGHT No. | TAIL No. | DATA | TEMP(°C) | VOLTAGE | MMSG | MMSG MATCHES |
|---|---|---|---|---|---|---|
| 1 | ABC | 5/1/17 | 50 | 10 | 0 | 0 |
| 2 | DEF | 5/2/17 | 20 | 15 | 1 | 0 |
| 3 | GHI | 5/8/17 | 30 | 12 | 1 | 1 |
| 4 | JKL | 5/8/17 | 25 | 13 | 1 | 1 |
| 5 | JKL | 5/8/17 | 26 | 18 | 1 | 1 |

| FLIGHT No. | TAIL No. | DATA | TEMP(°C) | VOLTAGE | MMSG | MMSG MATCHES |
|---|---|---|---|---|---|---|
| 4 | JKL | 5/8/17 | 25 | 13 | 1 | 1 |
| 5 | JKL | 5/8/17 | 26 | 18 | 1 | 1 |

SYSTEM AND METHOD FOR AIRCRAFT FAILURE PREDICTION

BACKGROUND

1. Field

The exemplary embodiments generally relate to failure prediction and in particular to failure prediction with an indicator as to why the failure prediction was made.

2. Brief Description of Related Developments

Generally, failure prediction is performed in a number of ways. For example, machine learning may be used where machine learning algorithms are trained to recognize anomalous data or patterns of the anomalous data received from sensors monitoring one or more system of a vehicle, such as an aircraft. Based on the anomalous data and/or patterns of the anomalous data the machine learning model indicates/predicts an impending fault.

Model based approaches for failure prediction are also used. In the model based approaches models are generated in an attempt to understand the physical model of the vehicle being analyzed. This model generally represents normal operation of the vehicle such that when anomalous operational data is sensed the model based approach indicates/predicts an impending fault.

Generally, the above-mentioned failure predictions approaches lack any explanation for the failure predictions being made.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to an aircraft component failure prediction apparatus comprising: a database coupled to at least one aircraft system, the database being configured to receive from the at least one aircraft system and store at least one multidimensional operation data matrix corresponding to operation of an aircraft component obtained from a plurality of aircraft, and at least one multidimensional maintenance message matrix corresponding to the operation of the aircraft component from the plurality of aircraft; and an aircraft maintenance controller coupled to the database, the aircraft maintenance controller being configured to classify operational data, in a first classification, of the at least one multidimensional operation matrix as corresponding with at least one maintenance message to form at least one classified multidimensional operation data matrix including classified data; classify the classified data of the at least one classified multidimensional data matrix with a machine learning model, in a second classification, to predict an occurrence of a future maintenance message for the aircraft component within a predetermined analysis time period, where the aircraft maintenance controller preprocess the at least one classified multidimensional operation data matrix to remove classification obscuring data from the at least one classified multidimensional operation data matrix, and generate an output of at least one partial dependency function on a user interface coupled to the aircraft maintenance controller, the output of the at least one partial dependency function being generated from the at least one classified multidimensional operation data matrix where the output of the at least one partial dependency function explains prediction of the occurrence of the future maintenance message by identifying at least which of the operational data is most frequently identified by the at least one maintenance message and operational ranges of the operational data most frequently identified by the at least one maintenance message.

Another example of the subject matter according to the present disclosure relates to a method for predicting aircraft component failure, the method comprising: receiving and storing, in a database coupled to at least one aircraft system, at least one multidimensional operation data matrix corresponding to operation of an aircraft component obtained from a plurality of aircraft, and at least one multidimensional maintenance message matrix corresponding to the operation of the aircraft component from the plurality of aircraft; and with an aircraft maintenance controller coupled to the database classifying operational data, in a first classification, of the at least one multidimensional operation matrix as corresponding with at least one maintenance message to form at least one classified multidimensional operation data matrix including classified data; classifying the classified data of the at least one classified multidimensional data matrix with a machine learning model, in a second classification, to predict an occurrence of a future maintenance message for the aircraft component within a predetermined analysis time period, where the at least one classified multidimensional operation data matrix is preprocessed to remove classification obscuring data from the at least one multidimensional data matrix, and generating on a user interface coupled to the aircraft maintenance controller, a visualization that explains prediction of the occurrence of the future maintenance message by identifying at least which of the operational data is most frequently identified by the at least one maintenance message and operational ranges of the operational data most frequently identified by the at least one maintenance message.

Still another example of the subject matter according to the present disclosure relates to a method for predicting aircraft component failure, the method comprising: receiving and storing, in a database coupled to at least one aircraft system, at least one multidimensional operation data matrix corresponding to operation of an aircraft component obtained from a plurality of aircraft, and at least one multidimensional maintenance message matrix corresponding to the operation of the aircraft component from the plurality of aircraft; and with an aircraft maintenance controller coupled to the database classifying operational data, in a first classification, of the at least one multidimensional operation matrix as corresponding with at least one maintenance message to form at least one classified multidimensional operation data matrix including classified data; classifying the classified data of the at least one classified multidimensional data matrix message with a machine learning model, in a second classification, to predict an occurrence of a future maintenance message for the aircraft component within a predetermined analysis time period; removing classified data from the at least one classified multidimensional operation data matrix so that the classified data remaining in the at least one classified multidimensional operation data matrix corresponds to a predetermined one of the aircraft and a predetermined one of the maintenance message for which the occurrence of the future maintenance message of the aircraft component is to be made, and generating an output of at least one partial dependency function on a user interface coupled to the aircraft maintenance controller, the output of the at least one partial dependency function being generated from the at least one classified multidimensional operation data matrix where the output of the at least one partial dependency function explains prediction of the occurrence of the future maintenance message by identifying at least which of the operational data is most frequently identified by the at least one maintenance message and operational ranges of the operational data most frequently identified by the at least one maintenance message.

BRIEF DESCRIPTION OF THE DRAWINGS

Figure 1:
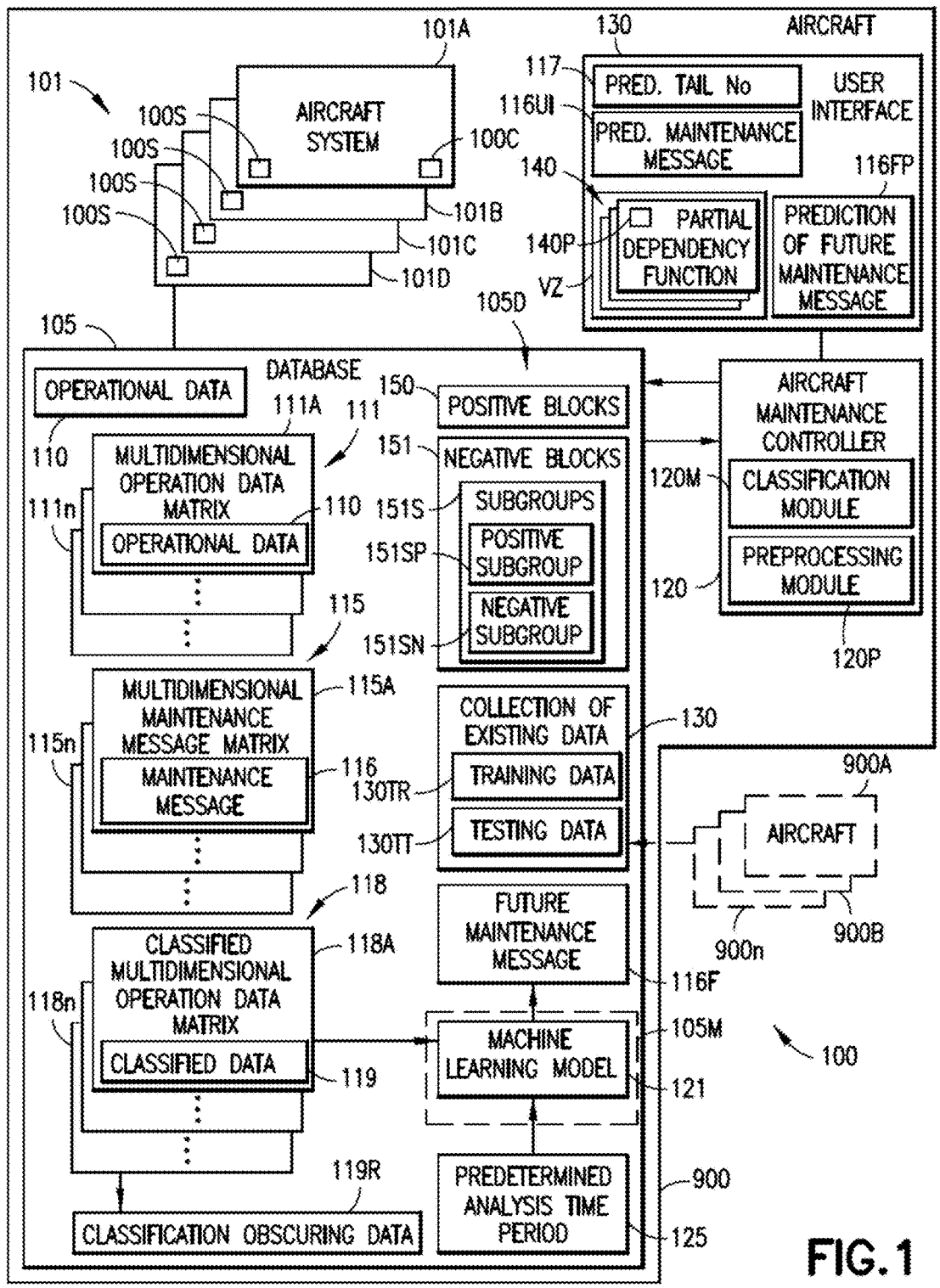
Figure 6A:
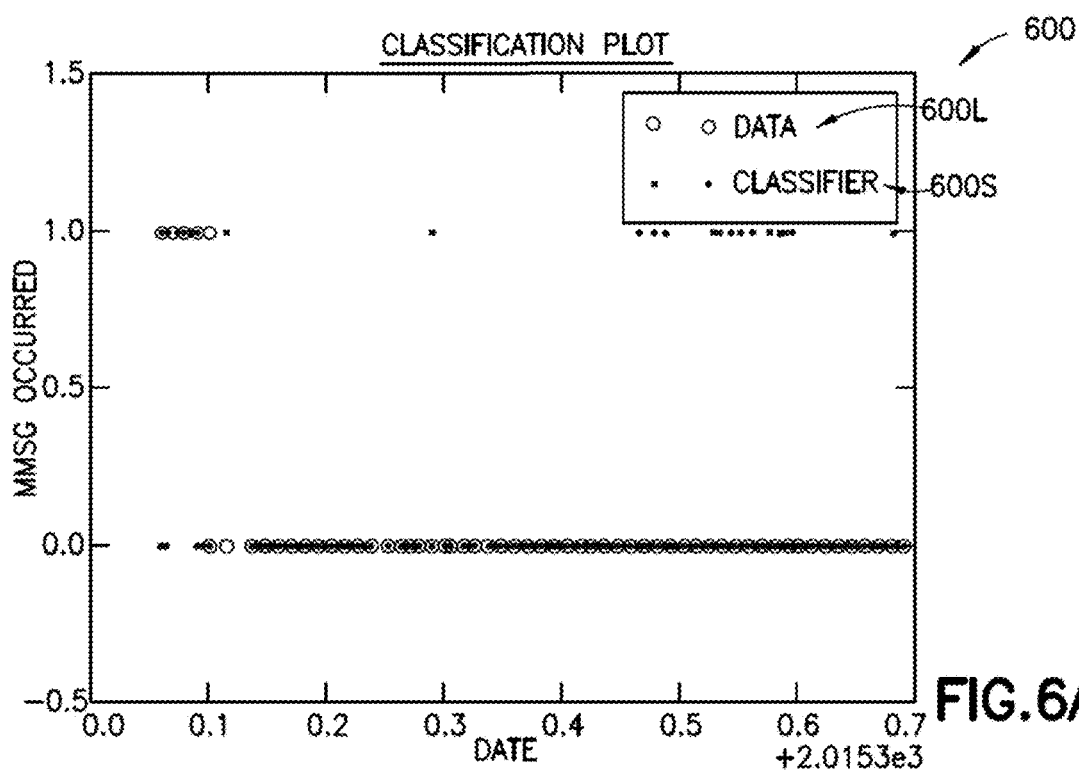
Figure 6B:
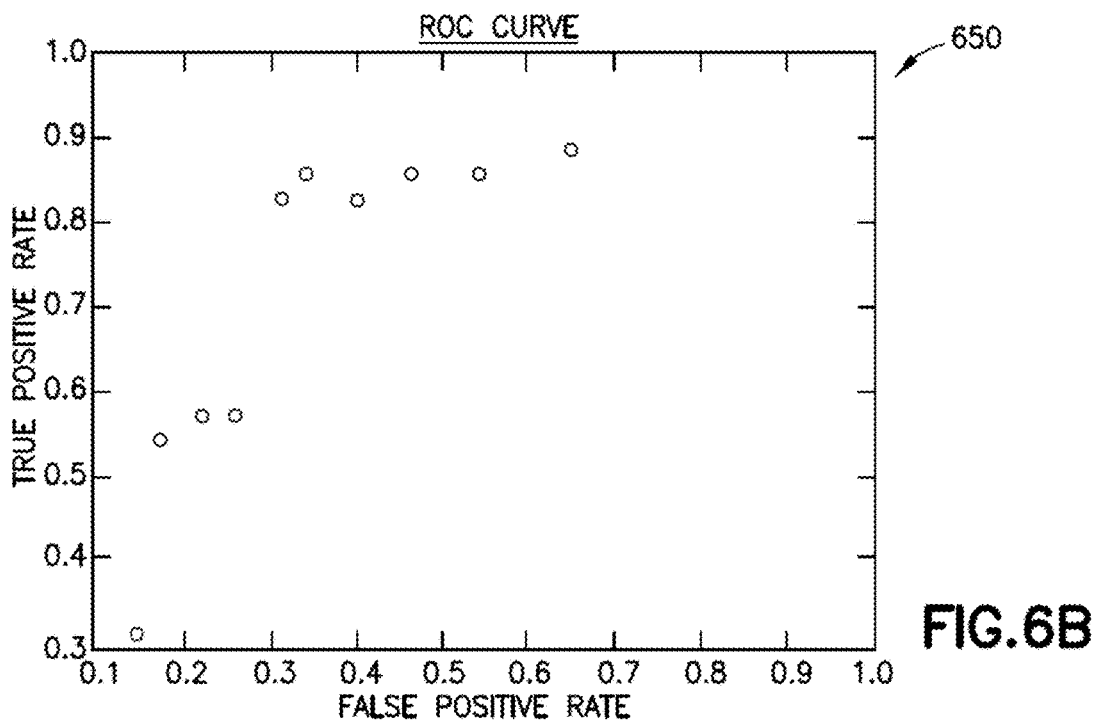
Figure 6C:
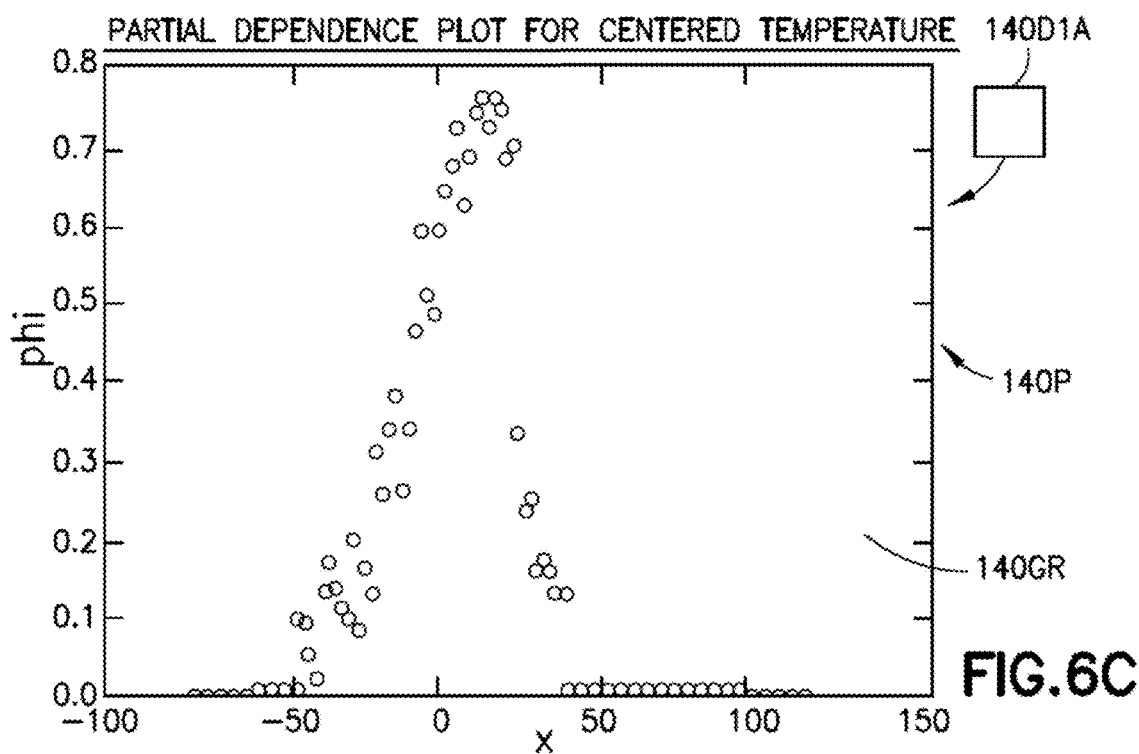
Figure 6D:
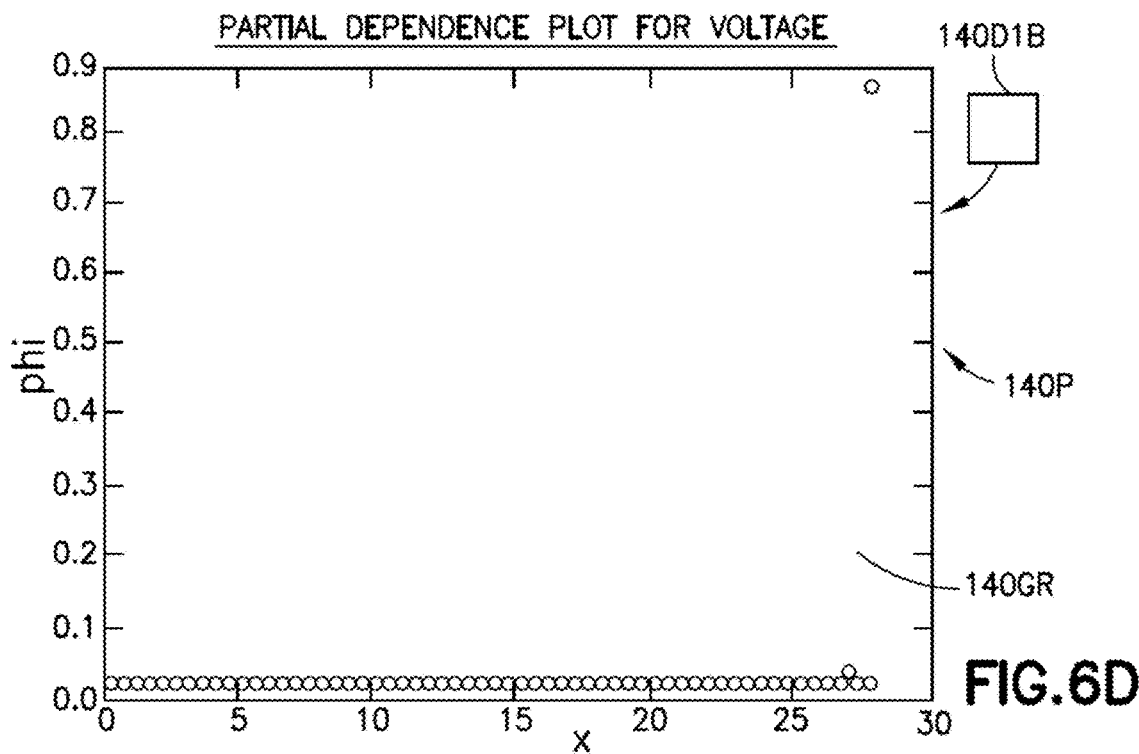
Figure 6E:
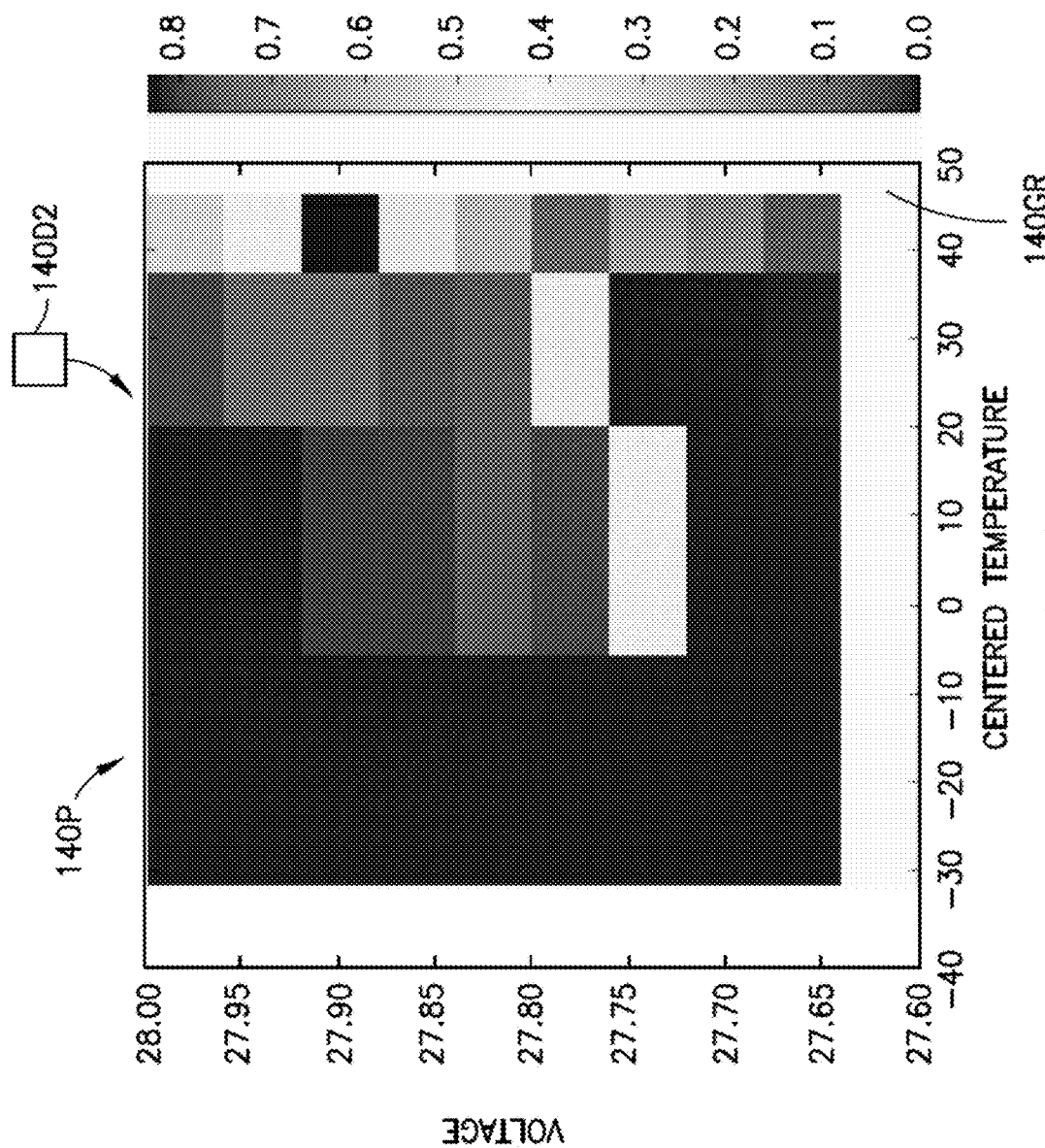
Figure 7:
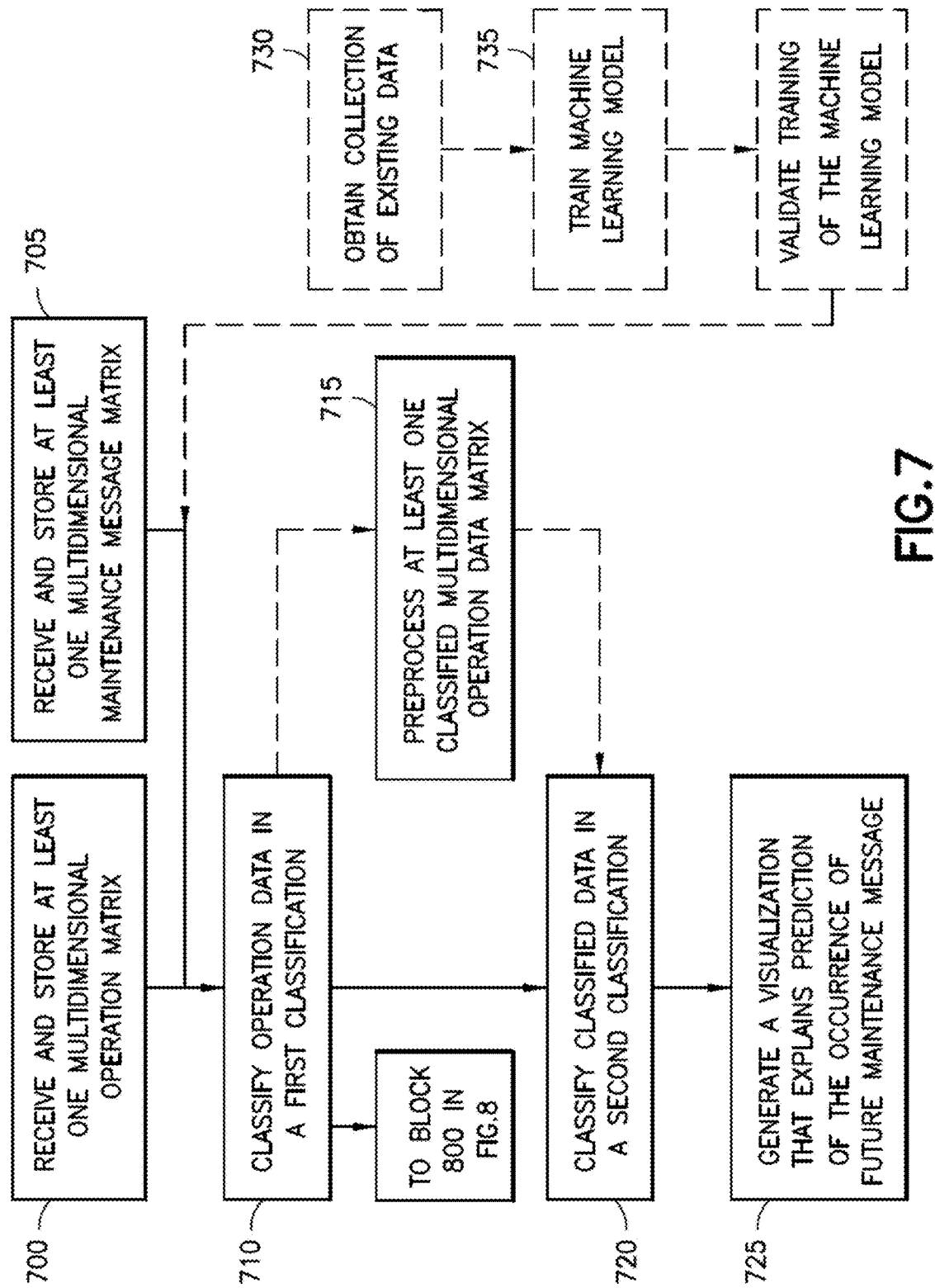
Figure 8:
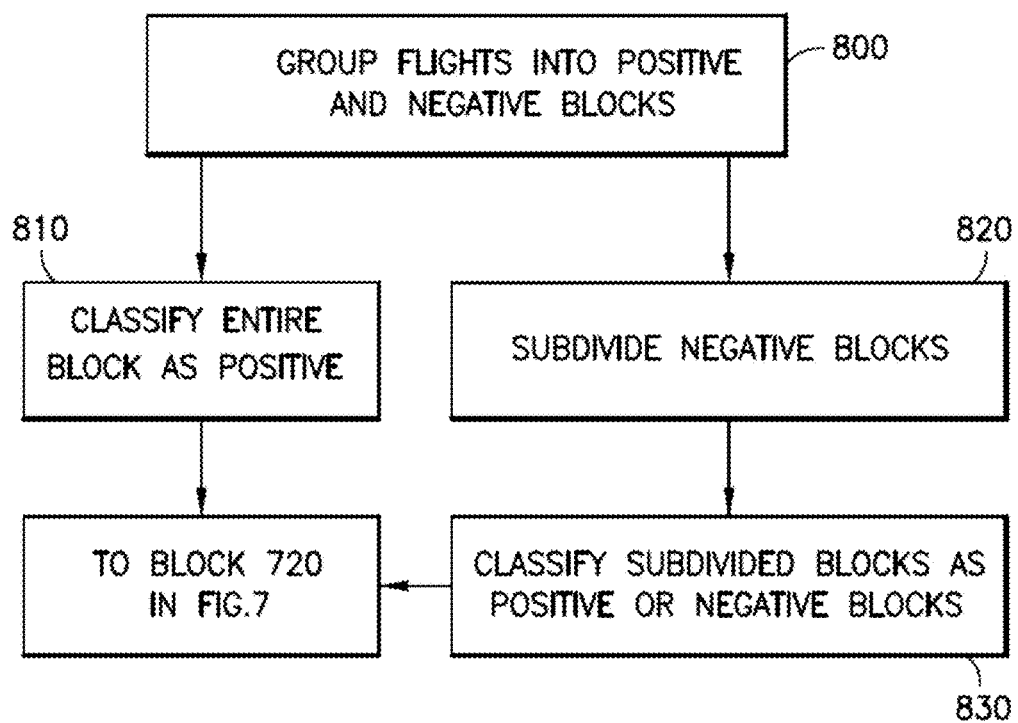
Figure 9:
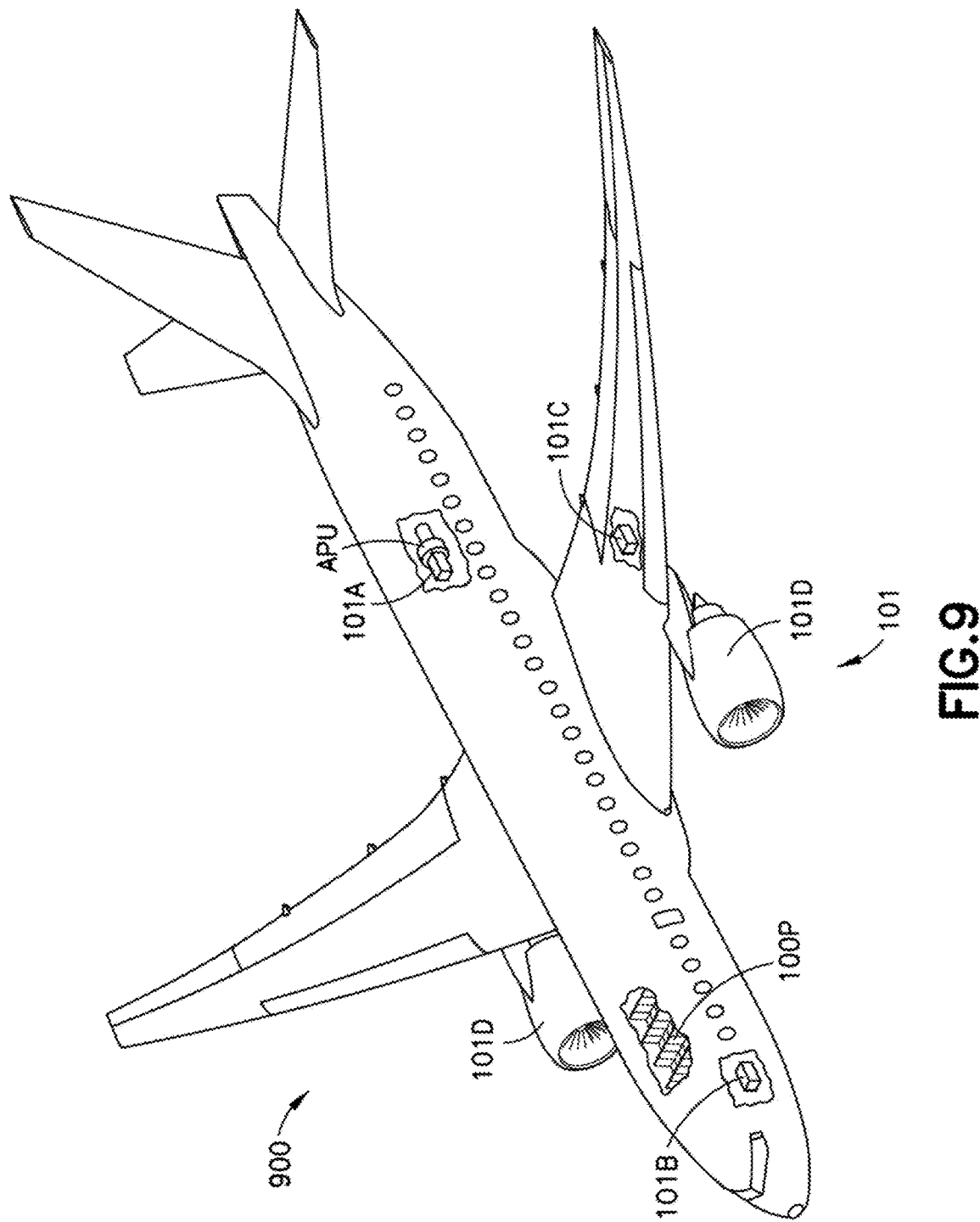
Figure 10:
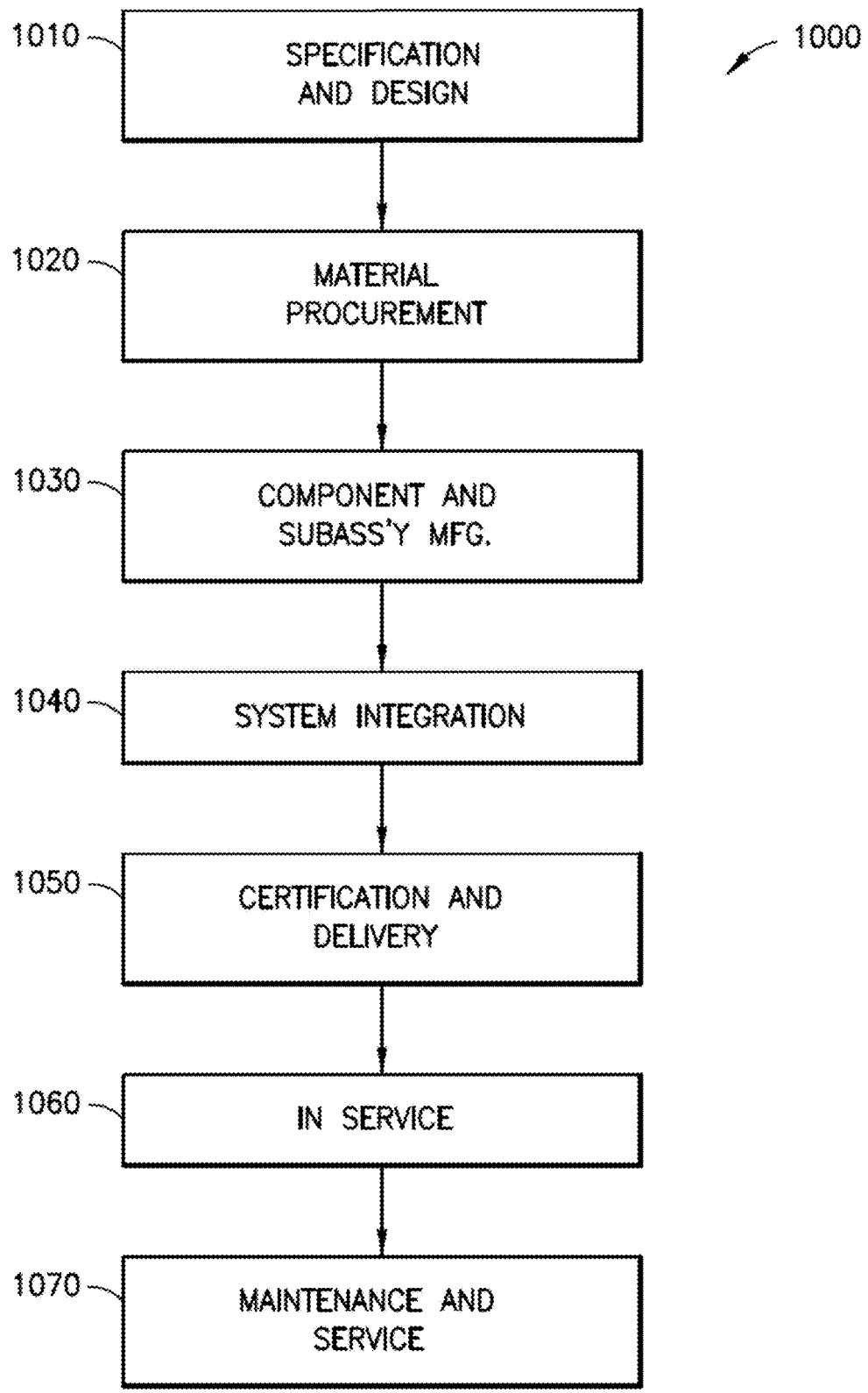

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic block diagram of a failure prediction apparatus in accordance with one or more aspects of the present disclosure;

FIG. 2 is an exemplary multidimensional operation data matrix, in which the data shown is merely exemplary in nature and may not reflect actual data collected, in accordance with one or more aspects of the present disclosure;

FIG. 3 is an exemplary multidimensional maintenance message matrix, in which the data shown is merely exemplary in nature and may not reflect actual data collected, in accordance with one or more aspects of the present disclosure;

FIG. 4 is an exemplary classified multidimensional operation data matrix, in which the data shown is merely exemplary in nature and may not reflect actual data collected, corresponding to the exemplary multidimensional operation data matrix of FIG. 2 in accordance with one or more aspects of the present disclosure;

FIG. 5 is an exemplary preprocessed classified multidimensional operation data matrix, in which the data shown is merely exemplary in nature and may not reflect actual data collected, corresponding to the exemplary multidimensional operation data matrix of FIG. 2 in accordance with one or more aspects of the present disclosure;

FIG. 6A is an exemplary classification plot for a maintenance message for an aircraft in accordance with one or more aspects of the present disclosure;

FIG. 6B is an exemplary classification curve corresponding to the classification plot of FIG. 6A in accordance with one or more aspects of the present disclosure;

FIG. 6C is an exemplary one-dimensional partial dependency plot for predetermined operation data in accordance with one or more aspects of the present disclosure;

FIG. 6D is an exemplary one-dimensional partial dependency plot for predetermined operation data in accordance with one or more aspects of the present disclosure;

FIG. 6E is an exemplary two-dimensional partial dependency plot for the predetermined operation data of FIGS. 6C and 6D in accordance with one or more aspects of the present disclosure;

FIG. 7 is a flow diagram of a method in accordance with one or more aspects of the present disclosure;

FIG. 8 is a flow diagram of a method in accordance with one or more aspects of the present disclosure;

FIG. 9 is perspective view of an aircraft in accordance with one or more aspects of the present disclosure; and FIG. 10 is a flow diagram of an aircraft production and service methodology.

DETAILED DESCRIPTION

Referring to FIGS. 1 and 9, the aircraft component failure prediction apparatus 100 and methods described herein provide for failure prediction with explanation as to why the failure prediction was made. Generally, it is beneficial prediction of failures in aircraft systems 101, such as the auxiliary power unit APU are beneficial due to, for example, the high cost associated with repair and maintenance of the aircraft 900. It is also beneficial for the failure predictions to be explainable so that maintenance personnel and engineers working on the aircraft 900 have insight into why the failure prediction is being made. For example, a user of the aircraft component failure prediction apparatus 100 may want to know why the aircraft systems 101 are failing, why the aircraft component failure prediction apparatus 100 makes failure predictions (e.g., the reasoning behind the failure prediction), and how the user can correct the aircraft systems 101 to prevent failure. Explainability may be beneficial so that the user understands the failure prediction, the user trusts the failure predictions made by the aircraft component failure prediction apparatus 100, and for the effective management of the aircraft systems 101.

While the aircraft component failure prediction apparatus 100 and methods are described herein with respect to an auxiliary power unit APU of an electrical system 101A of the aircraft 900, in other aspects the failure prediction system 100 and methods may be applied to any suitable aircraft system 100 of the aircraft 900. In still other aspects, the failure prediction system 100 and methods may be applied to any system of any suitable aerospace vehicle, maritime vessel, automotive vehicle, and/or electrical/mechanical machine for which operational data is collected for the system(s) and maintenance messages are issued.

Illustrative, non-exhaustive examples, which may or may not be claimed, of the subject matter according to the present disclosure are provided below.

Referring to FIGS. 1 and 9, the aircraft 100 may be any suitable aircraft having at least one aircraft system 101. For example, the aircraft 100 may include an electrical system 101A, a hydraulic system 101C, a propulsion system 101D, and an environmental system 101B. The electrical system 101A includes an auxiliary power unit APU. The environmental system 101B may at least provide fresh air to an interior 100P of the aircraft. Each of the electrical system 101A, the hydraulic system 101C, the propulsion system 101B, and the environmental system 101B include respective sensors 100S that are configured to capture operational data 110 of the respective aircraft system 101.

The aircraft 900 may include the aircraft component failure prediction apparatus 100 onboard the aircraft 900, while in other aspects the aircraft component failure prediction apparatus 100 may be coupled to the aircraft 900 in any suitable manner. The aircraft component failure prediction apparatus 100 includes a database 105, an aircraft maintenance controller 120 coupled to the database 105, and a user interface 199. The database 105 is defined as any number of suitable non-transitory storage locations that are accessible by at least the aircraft maintenance controller 120 where each non-transitory storage location includes one or more of a model storage 105M and data storage 105D. The model storage 105M is defined as a non-transitory storage in which at least one machine learning model 121 is stored in one or more of the following ways: as separate files; as a structured set of data; as a semi-structured set of data; as an unstructured set of data; and/or as applications in the model storage 105M, In one aspect, the database 105 may be included in, for example, any suitable data logger of the aircraft 900 such as a flight data recorder.

The aircraft maintenance controller 120 may be a component of any suitable controller onboard the aircraft 900, a standalone/dedicated controller onboard the aircraft 900, or coupled to the aircraft 900 in any suitable manner (such as through, e.g., a wired or wireless connection). The user interface 199 is coupled to the aircraft maintenance controller 120 in any suitable manner and may comprise any suitable graphical user interface onboard the aircraft 900 or any suitable graphical user interface coupled to the aircraft 900 in any suitable manner (e.g., through a wired or wireless connection).

The database 105 may be coupled to the at least one aircraft system 101 in any suitable manner (e.g., through a wired or wireless connection) so as to receive the operational data 110 from the sensors 100S. The operational data 110 may be stored in the database 105 in any suitable manner such as in at least one multidimensional operation data matrix 111 corresponding to operation of an aircraft component 100C of an aircraft system 101A-101D obtained from a plurality of aircraft 900, 900A-900n. Each aircraft component 100C of the aircraft systems 101A-101D may have a respective multidimensional operation data matrix 111A-111n. In other aspects, the at least one multidimensional operation data matrix 111 corresponds to operation of an aircraft component 100C (such as, e.g., the auxiliary power unit APU) of an aircraft system 101A-101D of at least the aircraft 900 in which the aircraft component failure prediction apparatus 100 is located or coupled to. Referring also to FIG. 2, each of the at least one multidimensional operation data matrix 111 may include an index of flight numbers 200. The at least one multidimensional operation data matrix 111 includes for each flight number 1-5, a tail number, a date and operational data 110 (which in this example includes a temperature and a voltage). In other aspects, the at least one multidimensional operation data matrix 111 may include any suitable information corresponding to operation of the aircraft component 100C.

In one aspect, each aircraft system 101A-101D may generate the at least one multidimensional operation data matrix 111 while in other aspects, the aircraft maintenance controller 120 may be configured to generate the at least one multidimensional operation data matrix 111 based on data received from at least the sensors 100S of at least aircraft 900, Operational data 110 from other aircraft 900A-900n of the plurality of aircraft 900, 900A-900n may be obtained by the database 105 in any suitable manner, such as through wireless or wired connections with the other aircraft 900A-900n or through input at the user interface 199, The operational data 110 from the other aircraft 900A-900n may be used in conjunction with the operational data 110 from aircraft 900 for generating the at least one multidimensional operation data matrix 111.

Referring again to FIGS. 1 and 9, the database 105 is also configured to receive and store at least one multidimensional maintenance message matrix 115 corresponding to the operation of the aircraft component 100C (such as, e.g., the auxiliary power unit APU) from the plurality of aircraft 900, 900A-900n, In other aspects, the at least one multidimensional maintenance message matrix 115 corresponds to operation of an aircraft component 100C (such as, e.g., the auxiliary power unit APU) of an aircraft system 101A-101D of at least the aircraft 900 in which the aircraft component failure prediction apparatus 100 is located or coupled to. Each aircraft component 100C of the aircraft systems 101A-101D may have a respective multidimensional maintenance message matrix 115A-115n. Referring also to FIG. 3, the at least one multidimensional maintenance message matrix 115 includes an index of flight numbers 300 that corresponds with the index of flight numbers 200 of the at least one multidimensional operation data matrix 111. The at least one multidimensional maintenance message matrix 115 also includes for each flight number 1-5, a tail number, a date and a maintenance message indication 310. The maintenance message indication 310 indicates whether a maintenance message has occurred for a respective flight number 1-5. If a maintenance message occurred the maintenance message number is entered into the at least one multidimensional maintenance message matrix 115 for the respective flight number 1-5. If a maintenance message has not occurred a null indication (e.g., in this example the null indication is represented as "---", but may be represented in any suitable manner) is entered into the at least one multidimensional maintenance message matrix 115 for the respective flight number 1-5. In other aspects, the at least one multidimensional maintenance message matrix 115 may include any suitable information corresponding to maintenance messages.

In one aspect, each aircraft system 101A-101D may generate a maintenance message 116 which is received and stored in the database 105 within the at least one multidimensional maintenance message matrix 115. In one aspect, the aircraft maintenance controller 120 may be configured to generate the at least one multidimensional maintenance message matrix 115 based on maintenance messages 116 received from the aircraft systems 101 of at least aircraft 900. Maintenance messages 116 from other aircraft 900A-900n of the plurality of aircraft 900, 900A-900n may be obtained by the database 105 in any suitable manner, such as through wireless or wired connections with the other aircraft 900A-900n or through input at the user interface 199. The maintenance messages 116 from the other aircraft 900A-900n may be used in conjunction with the maintenance messages 116 from aircraft 900 for generating the at least one multidimensional maintenance message matrix 115.

Still referring to FIG. 1, the aircraft maintenance controller 120 is configured to classify the operational data 110, in a first classification, of the at least one multidimensional maintenance message matrix 115 as corresponding with at least one maintenance message 116 to form at least one classified multidimensional operation data matrix 115 including classified data 119. Each aircraft component 100C of the aircraft systems 101A-101D may have a respective classified multidimensional operation data matrix 118A-118n. In one aspect, the aircraft maintenance controller 120 may have a classification module 120M that includes any suitable non-transitory computer program code for classifying data as described herein. For example, the aircraft maintenance controller 120 is configured to classify the operational data 110, in the first classification, by comparing a flight number 1-5 in the at least one multidimensional maintenance message matrix 115 for which a maintenance message 116 exists with flight numbers 1-5 in the at least one multidimensional operation data matrix 111 to determine matching flight numbers 1-5 for a predetermined maintenance message 116UI and whether the matching flight numbers 1-5 are within a predetermined time period (e.g., within about 24 hours or more or less than about 24 hours) from each other. Matching the maintenance messages 116 to flights within the predetermined time period may ensure matching the maintenance message 116 with a single flight having flight number 1 rather than two or more flights having flight number 1 where the two or more flights occur on different, days (e.g., flight numbers may be reused from day to day). FIG. 4 illustrates an example of the at least one classified multidimensional operation data matrix 118 which is substantially similar to the at least one multidimensional operation data matrix 111 except a maintenance message classifier 400 is added. Here the maintenance message classifier comprises a "0" if a maintenance message 116 was not issued for the respective flight 1-5, and comprises a "1" if a maintenance message 116 was issued for the respective flight. The at least one classified multidimensional operation data matrix 118 also includes a maintenance message correspondence classification 410 which will be described below.

The aircraft maintenance controller 120 is configured to preprocess the at least one classified multidimensional operation data matrix 118 to remove classification obscuring data 119R from the at least one classified multidimensional operation data matrix 118. In one aspect, the aircraft maintenance controller 120 may include a preprocessing module 120P that includes any suitable non-transitory computer program code for preprocessing data as described herein. For example, the aircraft maintenance controller 120 is configured to preprocess the at least one classified multidimensional operation data matrix 118 by removing classified data 119 (such as, e.g., the classification obscuring data 119R) from the at least one classified multidimensional operation data matrix 118 so that the classified data 119 remaining in the at least one classified multidimensional operation data matrix 118 corresponds to a predetermined one of the aircraft 900, 900A-900n and a predetermined one of the maintenance message 116 for which a prediction of the occurrence of the future maintenance message 116FP of the aircraft component 100C is to be made. For example, Referring to FIGS. 3, 4, and 5, if a prediction of maintenance message "JKL" is to be made by the aircraft component failure prediction apparatus 100 the aircraft maintenance controller 120 is configured to classify the flights 1-5 in the at least one classified multidimensional operation data matrix 118 with a maintenance message correspondence classification 410 that indicates whether the maintenance message for the flight 1-5 matches/corresponds with the maintenance message "56789" being analyzed. Here, the maintenance message correspondence classification 410 comprises a "0" if a maintenance message 116 for the respective flight 1-5 does not match the maintenance message "56789" being analyzed, and comprises a "1" if the maintenance message 116 for the respective flight 1-5 matches the maintenance message "56789" being analyzed.

In addition, the aircraft maintenance controller 120 may also be configured to preprocess the at least one classified multidimensional operation data matrix 118 to remove flights from the at least one classified multidimensional operation data matrix 118 that do not match a predetermined tail number 117 for which the prediction of the occurrence of the future maintenance message 116FP is being made. For example, if the prediction of the occurrence of the future maintenance message 116FP is being made for an aircraft 900 having tail number "JKL", the aircraft maintenance controller 120 may modify the at least one classified multidimensional operation data matrix 118 so that a preprocessed at least one classified multidimensional operation data matrix 118CM is formed and includes only flights corresponding to a predetermined tail number 117 (e.g., tail number "JKL") and a predetermined maintenance message 116UI (e.g., maintenance message "56789"). The predetermined tail number 117 and the predetermined maintenance message 116UI may be user specified entries to the aircraft maintenance controller 120 that are entered in any suitable manner, such as through the user interface 199.

Referring again to FIG. 1, the aircraft controller 120 is also configured, such as with e.g., the classification module 120M, to classify the classified data 119, of the at least one classified multidimensional operation data matrix 118 with a machine learning model 121, in a second classification, to predict an occurrence of a future maintenance message 116F for the aircraft component 100C within a predetermined analysis time period 125. As noted above, in the second classification, the classification obscuring data 119R has been removed so that the second classification is performed on the preprocessed at least one classified multidimensional operation data matrix 118CM having only the flight numbers corresponding to the predetermined tail number 117 and predetermined maintenance message 116UI.

The machine learning model 121 may be trained to recognize faults in the operational data 110 for a respective one or more maintenance message (s) 116 based on training of the machine learning model 121 with at least training data 130TR included in a collection of existing data 130. The machine learning model 121 may be any suitable machine learning model such as, for example, a random forest model. In one aspect, there may be a machine learning model 121 for predicting the occurrence of each maintenance message 116 (e.g., there may be a number of different maintenance messages as illustrated in FIGS. 2-5 where a machine learning model exists for predicting the occurrence of each different maintenance message). In other aspects a single machine learning model may apply for predicting the occurrence of one or more maintenance messages. The database 105 may receive the collection of existing data 130 in any suitable manner, such as through the user interface 199 and/or through connection with the other aircraft 900A-900n, The collection of existing data 130 may also be periodically updated based on the operational data 110 from aircraft 900. For example, upon suitable verification of the prediction of the occurrence of the future maintenance message 116FP the operational data corresponding to the future maintenance message 116F may be added to the collection of existing data 130 to improve the classification accuracy of the machine learning model 121.

For a specified maintenance message 116, there will be subset of tail numbers for which that maintenance message occurred (as illustrated in FIGS. 2-5 where maintenance message "56789" corresponds to tail numbers "GHI" and "JKL"). As described above, the collection of existing data 130 is a collection of data from the plurality of aircraft 900, 900a-900n, each of the plurality of aircraft 900, 900A-900n having a different tail number than other ones of the plurality of aircraft 900, 900A-900n, The training data 130TR includes the existing data (which includes, e.g., operation data 110 and corresponding maintenance messages 116) for all of the plurality of aircraft 900, 900A-900n except for one of the plurality of aircraft 900, 900A-900n. The operation data 110 and corresponding maintenance messages 116 from the one of the plurality of aircraft 900, 900A-900n forms testing data 130TT. The aircraft maintenance controller 120 is configured to train the machine learning model 121, in any suitable manner, with the training data 130TR so that the machine learning model 121 indicates/predicts the maintenance message being analyzed will occur within the predetermined analysis time period 125. In one aspect, the predetermined analysis time period 125 may be about two weeks, while in other aspects the predetermined analysis time period 125 may be more or less than about two weeks. The aircraft maintenance controller 120 is also configured to validate accuracy of the training of the machine learning model 121 with the testing data 130TT in any suitable manner.

The machine learning model 121, once trained, may classify the flights in the preprocessed at least one classified multidimensional operation data matrix 118CM as being indicative of an aircraft component 100C failure and the occurrence of the predetermined maintenance message 116UI being analyzed (e.g., a positive classification) or being indicative of aircraft component 100C normal operation (e.g., a negative classification). A positive classification means that the predetermined maintenance message 116UI is predicted to occur within the predetermined analysis time period 125. The negative indication means that the predetermined maintenance message 116OI may not occur within the predetermined analysis time period 125.

Referring to FIGS. 1 and 5, the aircraft maintenance controller 120 is configured to reduce a number of false positive failure indications in the second classification in any suitable manner, such as with, e.g., the classification module 120M in a block classification. For example, the aircraft maintenance controller 120 is configured to reduce the number of false positive failure indications by grouping flights 4-5 (while only two flights 4-5 are shown in FIG. 5 for exemplary purposes, in practice there may be more than two flights) into positive blocks 150 that are indicative of the occurrence of the future maintenance message 116F within the predetermined analysis time period 125, and into negative blocks 151 that are indicative that the future maintenance message 116F will not occur within the predetermined analysis time period 125. To group the flights into the positive blocks 150 and the negative blocks 151, the aircraft maintenance controller 120 is configured to group flights 4-5 occurring within a predetermined blocking time period (such, as for example, two weeks but in other aspects the predetermined time period may be more or less than two weeks) preceding a maintenance message 116 occurrence into a positive block. The aircraft maintenance controller 120 is also configured to group flights 4-5 occurring after the maintenance message 116 occurrence and flights 4-5 occurring more than the predetermined blocking time period preceding the maintenance message 116 occurrence into respective negative blocks.

The aircraft maintenance controller 120 is configured to identify an entire positive block 150 as being indicative of the occurrence of the future maintenance message 116F when a predetermined number of flights 4-5 within the entire positive block 150 are classified as being indicative of the occurrence of the future maintenance message 116F in the second classification. The aircraft maintenance controller 120 is configured to divide the respective negative blocks 151 into sub-groups 151S where a respective sub-group 151S is identified as being a positive sub-group 151SP indicative of the occurrence of the future maintenance message 116F when a predetermined number of flights 4-5 within the respective sub-group 151S are classified as being indicative of the occurrence of the future maintenance message 116F in the second classification; otherwise the respective sub-group 151S is identified as being a negative sub-group 151SN indicative that the future maintenance message 116F will not occur within the predetermined analysis time period 125.

The aircraft maintenance controller 120 is configured to generate at least one classification plot 600 (as illustrated in FIG. 6A) from the positive blocks 150, the positive sub-groups 151SP, and the negative sub-groups 151SN to predict the occurrence of the future maintenance message 116F for the aircraft component within the predetermined analysis time period 125, where each classification plot 600 identifies how the classified data 119 within a single flight is classified in the second classification. As can be seen in FIG. 6A, the larger points 600L indicate the flights as classified in the second classification, where a classification of "1" indicates that the future maintenance message 116F will occur within the predetermined analysis time period 125 and a classification of "0" indicates that the future maintenance message 116F may not occur within the predetermined analysis time period 125. The smaller points 600S indicate the flights as classified in the block classification, where a classification of "1" indicates a positive block and that the future maintenance message 116F will occur within the predetermined analysis time period 125 and a classification of "0" indicates a negative block 151 and that the future maintenance message 116F may not occur within the predetermined analysis time period 125. As can be seen in FIG. 6A, where the larger points 600L and the smaller points 600S overlap, this is an indication of a true negative or a true positive of whether or not the future maintenance message 116F will occur within the predetermined analysis time period 125. Where the larger points 600L and the smaller points 600S do not overlap, this is an indication of a false positive or a false negative of whether or not the future maintenance message 116F will occur within the predetermined analysis time period 125. For example, the greater the number of true positives illustrated on the classification plot 600 the greater the occurrence of the future maintenance message 116F within the predetermined analysis time period 125.

The aircraft maintenance controller 120 is also configured to generate at least one receiver operating characteristic curve 650 (an exemplary receiver operating characteristic curve is illustrated in FIG. 6B) from the positive blocks 150, the positive sub-groups 151SP, and the negative sub-groups 151SN to predict the occurrence of the future maintenance message 116F for the aircraft component 100C within the predetermined analysis time period 125. For example, the larger the area under the ROC curve the greater the occurrence of the future maintenance message 116F within the predetermined analysis time period 125.

Referring to FIGS. 1, 6C, and 6D, the aircraft maintenance controller 120 is configured to generate an output 140P at least one partial dependency function 140 on the user interface 199 coupled to the aircraft maintenance controller 120. Partial dependency function(s) 140 can be used in conjunction with the machine learning model 121 in order to make the prediction method explainable through a characterization of important features, and important interactions between pairs of features. The partial dependency function 140 is a function which takes as input a vector of possible inputs for some number of features, sets a single specified feature of each input vector to a fixed value x, and outputs the empirical probability in this altered set of input vectors that the classifier, such as the machine learning model and/or block classification described above, will output 1 rather than 0. The at least one partial dependency function 140 is generated from the at least one classified multidimensional operation data matrix 118. The at least one partial dependency function 140 explains a prediction of the occurrence of the future maintenance message 116F by identifying at least which of the operational data 110 is most frequently identified by the at least one maintenance message 116 and operational ranges of the operational data 110 most frequently identified by the at least one maintenance message 116.

In one aspect, the partial dependency function 140 is a one dimensional partial dependency function 140D1A, 140D1B that produces as an output 140P (as illustrated in FIGS. 6C and 6D) visualizations (e.g., graphical representations 140GR) of trends for the classified data 119 and ranges of values (see the X-axis in the graphs illustrated in FIGS. 6C and 6D) for the classified data 119 that are indicative of the occurrence of the future maintenance message 116F. The partial dependency function 140 may be defined given a dataset D of dimension d with n entries, a vector of n outputs y, and a classifier F. The one dimensional partial dependency function(s) 140 for this dataset is/are defined as follows:

$$f_i(x) = \frac{\sum_{\vec{x} = \in D} F(x_1, x_2, \ldots, x_{i-1}, x, x_{i+1}, \ldots, x_d)}{n}$$

The function $f_i$ explains the role of the ith feature in the classifier, showing which features are important and for which value ranges. As can be seen in FIG. 6C, the value range of about −50 to about +50 is an important value range for a temperature of the aircraft component 100C. As can be seen in FIG. 6D, the value range of about 26 to about 27 is an important value range for the voltage.

In another aspect, the partial dependency function 140 is a two dimensional partial dependency function 140D2 that produces as an output 140P (as illustrated in FIG. 6E) visualizations (e.g., graphical representations 140GR) of interactions between two dimensions (in the example shown in FIG. 6E the two dimensions are voltage and temperature) of the classified data 119 that are indicative of the occurrence of the future maintenance message 116F. Given the data set described above with respect to the one dimensional partial dependency, a two dimensional partial dependency may be defined as:

$$f_{i,j}(x, y) = \frac{\sum_{\vec{x} = \in D} F(x_1, x_2, \ldots, x_{i-1}, x, x_{i+1}, \ldots, x_{j-1}, y, x_{j+1}, \ldots, x_d)}{n}$$

The two dimensional partial dependency may provide for the visualization of the interactions between features via heat maps as shown in FIG. 6E which may provide greater insight as to why the future maintenance message 116F was predicted to occur than the one dimensional partial dependency function 140D1A, 140D1B. For example, FIG. 6C may lead one to believe that values of the centered temperature near about 10 are most likely to be a classified as a 1, but the heat map in FIG. 6E reveals that it is the values near about 50 that have a higher probability of being classified as a 1 when the interactions between voltage and centered temperature are taken into account.

Referring now to FIGS. 1 and 7, an exemplary operation of the aircraft component failure prediction apparatus 100 will be provided. At least one multidimensional operation data matrix 111 corresponding to operation of an aircraft component 100C obtained from a plurality of aircraft 900, 900A-900n is received and stored in the database 105 (FIG. 7, Block 700). At least one multidimensional maintenance message matrix 115 corresponding to the operation of the aircraft component 100C from the plurality of aircraft 900, 900A-900n is also is received and stored in the database 105 (FIG. 7, Block 705).

The operational data 110 of the at least one multidimensional operation data matrix 111 is classified, in a first classification with the aircraft maintenance controller 120, (FIG. 7, Block 710) as corresponding with at least one maintenance message 116 to form at least one classified multidimensional operation data matrix 118 including classified data 119. For example, the operational data 110 is classified in the first classification by comparing a flight number 1-5 (FIG. 3) in the at least one multidimensional maintenance message matrix 115 for which a maintenance message exists with flight numbers 1-5 (FIG. 3) in the at least one multidimensional operation data matrix 111 to determine matching flight numbers 1-5 for the predetermined maintenance message 116UI and whether the matching flight numbers are within the predetermined time period (e.g., within about 24 hours or more or less than about 24 hours, as described above) from each other.

In one aspect, the at least one classified multidimensional operation data matrix 118 is preprocessed (FIG. 7, Block 715) to remove classification obscuring data 119R from the at least one classified multidimensional data matrix 118. For example, the at least one classified multidimensional operation data matrix 118 is preprocessed by removing classified data 119 (e.g., the classification obscuring data 119R) from the at least one classified multidimensional operation data matrix 118 so that the classified data 119 remaining in the at least one classified multidimensional operation data matrix 118 corresponds to a predetermined one of the aircraft 900 and a predetermined one of the maintenance message 116UI for which the occurrence of the future maintenance message 116F of the aircraft component 110C is to be made. As described above, this preprocessing results in the preprocessed classified multidimensional operation data matrix 118CM, an example of which is illustrated in FIG. 5.

The classified data 119 of the at least one classified multidimensional operation data matrix 118 is classified, with the aircraft maintenance controller 120, with the machine learning model 121, in a second classification, (FIG. 7, Block 720) to predict an occurrence of a future maintenance message 116F for the aircraft component 100C within the predetermined analysis time period 125. The number of false positive failure indications in the second classification is reduced by the aircraft maintenance controller 120. For example, reducing the number of false positive failure indications includes grouping flights 4-5 (FIG. 5) into the positive blocks 150 and the negative blocks (FIG. 8, Block 800). As described above, the positive blocks 150 are indicative of the occurrence of the future maintenance message 116F within the predetermined analysis time period 125, and the negative blocks 151 are indicative that the future maintenance message 116F will not occur within the predetermined analysis time period 125. Flights 4-5 (FIG. 5) occurring within a predetermined blocking time period (as described above) preceding a maintenance message 116 occurrence are grouped into a positive block 150. Flights 4-5 (FIG. 5) occurring after the maintenance message 116 occurrence and flights 4-5 (FIG. 5) occurring more than the predetermined blocking time period preceding the maintenance message 116 occurrence are grouped into respective negative blocks 151.

An entire positive block 150 is identified/classified (FIG. 8, Block 810) as being indicative of the occurrence of the future maintenance message 116F when a predetermined number of flights 4-5 (FIG. 5) within the entire positive block 150 are classified as being indicative of the occurrence of the future maintenance message 116F in the second classification. The respective negative blocks 151 are divided into sub-groups 151S (FIG. 8, Block 820) where a respective sub-group 151S is identified/classified as being a positive sub-group 115SP or a negative sub-group 151SN (FIG. 8, Block 830). The respective sub-group 151S is identified/classified as being a positive sub-group 151SP indicative of the occurrence of the future maintenance message 116F when a predetermined number of flights 4-5 (FIG. 5) within the respective sub-group 151S are classified as being indicative of the occurrence of the future maintenance message 116F in the second classification, otherwise the respective sub-group 151S is identified as being a negative sub-group 151SN indicative that the future maintenance message 116F will not occur within the predetermined analysis time period 125.

The second classification may include, the generation of at least one classification plot 600 (FIG. 6A), as described above, from the positive blocks 150, the positive sub-groups 151SP, and the negative sub-groups 151SN. The occurrence of the future maintenance message 116F may be predicted for the aircraft component 100C within the predetermined analysis time period 125 using the at least one classification plot 600 (as described above), where each classification plot 600 identifies how the classified data 119 within a single flight 4-5 (FIG. 5) is classified in the second classification. The prediction of the occurrence of the future maintenance message 116FP may be presented on the user interface 199 coupled to the aircraft maintenance controller 120.

The second classification may include generating at least one receiver operating characteristic curve 650 (FIG. 6B) from the positive blocks 150, the positive sub-groups 151SP, and the negative sub-groups 151SN. The occurrence of the future maintenance message 116F for the aircraft component 100C within the predetermined analysis time period 125 may be predicted based on the receiver operating characteristic curve 650 (as described above). The prediction of the occurrence of the future maintenance message 116FP may be presented on the user interface 199 coupled to the aircraft maintenance controller 120.

A visualization VZ that explains prediction of the occurrence of the future maintenance message 116F may be generated (FIG. 7, Block 725), by the aircraft maintenance controller 120, on the user interface 199 coupled to the aircraft maintenance controller 120. The visualization VZ may explain the prediction of the occurrence of the future maintenance message 116F by identifying at least which of the operational data 110 is most frequently identified by the at least one maintenance message 116 and operational ranges of the operational data 110 most frequently identified by the at least one maintenance message 116. For example, the visualization VZ includes a graphical representation of a one dimensional partial dependency function 140D1A, 140D1B (FIGS. 6C and 6D) visualizing trends for the classified data 119 and ranges of values for the classified data 119 that are indicative of the occurrence of the future maintenance message 116F. As another example, the visualization VZ includes a graphical representation of a two dimensional partial dependency function 140D2 visualizing interactions between two dimensions of the classified data 119 that are indicative of the occurrence of the future maintenance message 116F.

As noted above, the aircraft maintenance controller 120 may train the machine learning model 121 to predict the occurrence of the future maintenance message 116F. For example, the collection of existing data 130 corresponding to a respective one of at least one maintenance message 116 may be obtained (FIG. 7, Block 730) from the database 105. As described above, the collection of existing data 130 corresponds to the plurality of aircraft 900, 900A-900n and includes training data 130TR that comprises the existing data from all but one of the plurality of aircraft 900, 900A-900n, and testing data 130TT that corresponds to the existing data of the one of the plurality of aircraft 900, 900A-900n. The machine learning model 121 is trained (FIG. 7, Block 735) with the training data 130TR so that the machine learning model 121 indicates the future maintenance message 116F will occur within the predetermined analysis time period 125. The accuracy of the training of the machine learning model 121 is validated (FIG. 7, Block 740) with the testing data 130TT.

While the exemplary operation of the aircraft component failure prediction apparatus 100 described above provided a prediction and corresponding explanation for a single maintenance message, the aircraft component failure prediction apparatus 100 may also substantially simultaneously predict the occurrence of multiple maintenance messages and substantially simultaneously provide corresponding explanations for the multiple maintenance messages. As described above, the aircraft component failure prediction apparatus 100 and method provide for prediction of the occurrence of the maintenance message(s) and explains the behavior of the classifier used to predict the occurrence in terms of individual dimensions (e.g., temperature, voltage, etc.) of the classified data 119 or in terms of pairs of dimensions of the classified data 119. In accordance with the aspects of the present disclosure, the removal of the classification obscuring data 119R may increase the accuracy of the prediction of the occurrence of the future maintenance message(s) 116F by removing data that may confuse the classifier (such as, e.g., the machine learning model 121) due to issues with the aircraft component 100C that are unrelated to the predetermined maintenance message 116UI being analyzed.

Referring to FIGS. 9 and 10, examples of the present disclosure may be described in the context of aircraft manufacturing and service method 1000 as shown in FIG. 10. In other aspects, the examples of the present, disclosure may be applied in any suitable industry, such as e.g. automotive, maritime, aerospace, etc. as noted above. With respect to aircraft manufacturing, during pre-production, illustrative method 1000 may include specification and design (FIG. 10, Block 1010) of aircraft 900 and material procurement (FIG. 10, Block 1020). During production, component and subassembly manufacturing (FIG. 10, Block 1030) and system integration (FIG. 10, Block 1040) of aircraft 900 may take place. Thereafter, aircraft 100 may go through certification and delivery (FIG. 10, Block 1050) to be placed in service (FIG. 10, Block 1060). While in service, aircraft 900 may be scheduled for routine maintenance and service (FIG. 10, Block 1070). Routine maintenance and service may include modification, reconfiguration, refurbishment, etc. of one or more systems of aircraft 900 which may include and/or be facilitated by the fault determination described herein.

Each of the processes of illustrative method 1000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1000. For example, components or subassemblies corresponding to component and subassembly manufacturing (FIG. 10, Block 1030) may be fabricated or manufactured in a manner similar to components or subassemblies produced while aircraft 900 is in service (block 1060). Similarly, one or more examples of the apparatus or method realizations, or a combination thereof, may be utilized, for example and without limitation, while aircraft 900 is in service (block 1060) and/or during maintenance and service (FIG. 10, Block 1070).

The following are provided in accordance with the aspects of the present, disclosure:

A1. An aircraft component failure prediction apparatus comprising:

a database coupled to at least one aircraft system, the database being configured to receive from the at least one aircraft system and store at least one multidimensional operation data matrix corresponding to operation of an aircraft component obtained from a plurality of aircraft, and at least one multidimensional maintenance message matrix corresponding to the operation of the aircraft component from the plurality of aircraft; and an aircraft maintenance controller coupled to the database, the aircraft maintenance controller being configured to classify operational data, in a first classification, of the at least one multidimensional operation matrix as corresponding with at least one maintenance message to form at least one classified multidimensional operation data matrix including classified data;

classify the classified data of the at least one classified multidimensional data matrix with a machine learning model, in a second classification, to predict an occurrence of a future maintenance message for the aircraft component within a predetermined analysis time period, where the aircraft maintenance controller preprocesses the at least one classified multidimensional operation data matrix to remove classification obscuring data from the at least one classified multidimensional operation data matrix, and generate an output of at least one partial dependency function on a user interface coupled to the aircraft maintenance controller, the output of the at least one partial dependency function being generated from the at least one classified multidimensional operation data matrix where the output of the at least one partial dependency function explains prediction of the occurrence of the future maintenance message by identifying at least which of the operational data is most frequently identified by the at least one maintenance message and operational ranges of the operational data most frequently identified by the at least one maintenance message.

A2. The aircraft component failure prediction apparatus of paragraph A1, wherein the partial dependency function is a one dimensional partial dependency function whose output provides for visualizing trends for the classified data and ranges of values for the classified data that are indicative of the occurrence of the future maintenance message.

A3. The aircraft component failure prediction apparatus of paragraph A1, wherein the partial dependency function is a two dimensional partial dependency function whose output provides for visualizing interactions between two dimensions of the classified data that are indicative of the occurrence of the future maintenance message.

A4. The aircraft component failure prediction apparatus of paragraph A1, wherein the aircraft component is an auxiliary power unit.

A5. The aircraft component failure prediction apparatus of paragraph A1, wherein the aircraft maintenance controller is further configured to:

obtain a collection of existing data, from the database, corresponding to a respective one of at least one maintenance message, where the collection of existing data corresponds to a plurality of aircraft and includes training data that comprises the existing data from all but one of the plurality of aircraft, and testing data that corresponds to the existing data of the one of the plurality of aircraft;

train the machine learning model with the training data so that the machine learning model indicates the future maintenance message will occur within the predetermined analysis time period; and validate accuracy of the training of the machine learning model with the testing data.

A6. The aircraft component failure prediction apparatus of paragraph A1, wherein the aircraft maintenance controller is configured to classify the operational data, in the first classification, by comparing a flight number in the at least one multidimensional maintenance message matrix for which a maintenance message exists with flight numbers in the at least one multidimensional operation data matrix to determine matching flight, numbers for a predetermined maintenance message and whether the matching flight numbers are within a predetermined time period from each other.

A7. The aircraft component failure prediction apparatus of paragraph A6, wherein the aircraft maintenance controller is configured to preprocess the at least one classified multidimensional operation data matrix by removing classified data from the at least one classified multidimensional operation data matrix so that the classified data remaining in the at least one classified multidimensional operation data matrix corresponds to a predetermined one of the aircraft and a predetermined one of the maintenance message for which the prediction of the occurrence of the future maintenance message of the aircraft component is to be made.

A8. The aircraft component failure prediction apparatus of paragraph A1, wherein the aircraft maintenance controller is further configured to reduce a number of false positive failure indications in the second classification, A9. The aircraft component failure prediction apparatus of paragraph A8, wherein the aircraft maintenance controller is configured to reduce the number of false positive failure indications by grouping flights into positive blocks that are indicative of the occurrence of the future maintenance message within the predetermined analysis time period, and into negative blocks that are indicative that the future maintenance message will not occur within the predetermined analysis time period.

A10. The aircraft component failure prediction apparatus of paragraph A9, wherein:

flights occurring within a predetermined blocking time period preceding a maintenance message occurrence are grouped into a positive block; and flights occurring after the maintenance message occurrence and flights occurring more than the predetermined blocking time period preceding the maintenance message occurrence are grouped into respective negative blocks.

A11. The aircraft component failure prediction apparatus of paragraph A10, wherein the aircraft maintenance controller is configured to identify an entire positive block as being indicative of the occurrence of the future maintenance message when a predetermined number of flights within the entire positive block are classified as being indicative of the occurrence of the future maintenance message in the second classification.

A12. The aircraft component failure prediction apparatus of paragraph A11, wherein the aircraft maintenance controller is configured to divide the respective negative blocks into sub-groups where a respective sub-group is identified as being a positive sub-group indicative of the occurrence of the future maintenance message when a predetermined number of flights within the respective sub-group are classified as being indicative of the occurrence of the future maintenance message in the second classification, otherwise the respective sub-group is identified as being a negative sub-group indicative that the future maintenance message will not occur within the predetermined analysis time period.

A13. The aircraft component failure prediction apparatus of paragraph A12, wherein the aircraft maintenance controller generates at least one receiver operating characteristic curve from the positive blocks, the positive sub-groups, and the negative sub-groups to predict the occurrence of the future maintenance message for the aircraft component within the predetermined analysis time period.

A14. The aircraft component failure prediction apparatus of paragraph A12, wherein the aircraft maintenance controller generates at least one classification plot from the positive blocks, the positive sub-groups, and the negative sub-groups to predict the occurrence of the future maintenance message for the aircraft component within the predetermined analysis time period, where each classification plot identifies how the classified data within a single flight is classified in the second classification.

A15. The aircraft component failure prediction apparatus of paragraph A1, wherein the output of the at least one partial dependency function explains prediction of the occurrence of the future maintenance message so that maintainers of the aircraft can act upon the prediction of the occurrence of the future maintenance message with an understanding of the prediction of the occurrence of the future maintenance message.

B1. A method for predicting aircraft component failure, the method comprising:
  receiving and storing, in a database coupled to at least one aircraft system, at least one multidimensional operation data matrix corresponding to operation of an aircraft component obtained from a plurality of aircraft, and at least one multidimensional maintenance message matrix corresponding to the operation of the aircraft component from the plurality of aircraft; and
  with an aircraft maintenance controller coupled to the database
  classifying operational data, in a first classification, of the at least one multidimensional operation matrix as corresponding with at least one maintenance message to form at least one classified multidimensional operation data matrix including classified data;
  classifying the classified data of the at least one classified multidimensional data matrix with a machine learning model, in a second classification, to predict an occurrence of a future maintenance message for the aircraft component within a predetermined analysis time period, where the at least one classified multidimensional operation data matrix is preprocessed to remove classification obscuring data from the at least one multidimensional data matrix, and
  generating on a user interface coupled to the aircraft maintenance controller, a visualization that explains prediction of the occurrence of the future maintenance message by identifying at least which of the operational data is most frequently identified by the at least one maintenance message and operational ranges of the operational data most frequently identified by the at least one maintenance message.

B2. The method of paragraph B1, wherein the visualization includes a graphical representation of a one dimensional partial dependency function visualizing trends for the classified data and ranges of values for the classified data that, are indicative of the occurrence of the future maintenance message.

B3. The method of paragraph B1, wherein the visualization includes a graphical representation of a two dimensional partial dependency function visualizing interactions between two dimensions of the classified data that are indicative of the occurrence of the future maintenance message.

B4. The method of paragraph B1, wherein the aircraft component is an auxiliary power unit.

B5. The method of paragraph B1, further comprising, with the aircraft maintenance controller:
  obtaining a collection of existing data, from the database, corresponding to a respective one of at least one maintenance message, where the collection of existing data corresponds to a plurality of aircraft and includes training data that comprises the existing data from all but one of the plurality of aircraft, and testing data that corresponds to the existing data of the one of the plurality of aircraft;
  training the machine learning model with the training data so that the machine learning model indicates the future maintenance message will occur within the predetermined analysis time period; and
  validating accuracy of the training of the machine learning model with the testing data.

B6. The method of paragraph B1, further comprising classifying, with the aircraft maintenance controller, the operational data, in the first classification, by comparing a flight number in the at least one multidimensional maintenance message matrix for which a maintenance message exists with flight numbers in the at least one multidimensional operation data matrix to determine matching flight numbers for a predetermined maintenance message and whether the matching flight numbers are within a predetermined time period from each other.

B7. The method of paragraph B6, further comprising, with the aircraft maintenance controller, preprocessing the at least one classified multidimensional operation data matrix by removing classified data from the at least one classified multidimensional operation data matrix so that the classified data remaining in the at least one classified multidimensional operation data matrix corresponds to a predetermined one of the aircraft and a predetermined one of the maintenance message for which the prediction of the occurrence of the future maintenance message of the aircraft component is to be made, B8. The method of paragraph B1, further comprising, with the aircraft maintenance controller, reducing a number of false positive failure indications in the second classification, B9. The method of paragraph B8, wherein reducing the number of false positive failure indications includes grouping flights into positive blocks that are indicative of the occurrence of the future maintenance message within the predetermined analysis time period, and into negative blocks that are indicative that the future maintenance message will not occur within the predetermined analysis time period.

B10. The method of paragraph B9, further comprising:
  grouping flights occurring within a predetermined blocking time period preceding a maintenance message occurrence into a positive block; and
  grouping flights occurring after the maintenance message occurrence and flights occurring more than the predetermined blocking time period preceding the maintenance message occurrence into respective negative blocks.

B11. The method of paragraph B10, further comprising identifying an entire positive block as being indicative of the occurrence of the future maintenance message when a predetermined number of flights within the entire positive block are classified as being indicative of the occurrence of the future maintenance message in the second classification.

B12. The method of paragraph B11, further comprising dividing the respective negative blocks into sub-groups where a respective sub-group is identified as being a positive sub-group indicative of the occurrence of the future maintenance message when a predetermined number of flights within the respective sub-group are classified as being indicative of the occurrence of the future maintenance message in the second classification, otherwise the respective sub-group is identified as being a negative sub-group indicative that the future maintenance message will not occur within the predetermined analysis time period.

B13. The method of paragraph B12, further comprising, with the aircraft maintenance controller:

generating at least one receiver operating characteristic curve from the positive blocks, the positive sub-groups, and the negative sub-groups; and predicting the occurrence of the future maintenance message for the aircraft component within the predetermined analysis time period based on the receiver operating curve.

B14. The method of paragraph B12, further comprising, with the aircraft maintenance controller:

generating at least one classification plot from the positive blocks, the positive sub-groups, and the negative sub-groups; and predicting the occurrence of the future maintenance message for the aircraft component within the predetermined analysis time period, where each classification plot identifies how the classified data within a single flight is classified in the second classification.

B15. The method of paragraph B1, wherein the visualization explains prediction of the occurrence of the future maintenance message so that maintainers of the aircraft can act upon the prediction of the occurrence of the future maintenance message with an understanding of the prediction of the occurrence of the future maintenance message.

C1. A method for predicting aircraft component failure, the method comprising:

receiving and storing, in a database coupled to at least one aircraft system, at least one multidimensional operation data matrix corresponding to operation of an aircraft component obtained from a plurality of aircraft, and at least one multidimensional maintenance message matrix corresponding to the operation of the aircraft component from the plurality of aircraft; and with an aircraft maintenance controller coupled to the database classifying operational data, in a first classification, of the at least one multidimensional operation matrix as corresponding with at least one maintenance message to form at least one classified multidimensional operation data matrix including classified data;

classifying the classified data of the at least one classified multidimensional data matrix message with a machine learning model, in a second classification, to predict an occurrence of a future maintenance message for the aircraft component within a predetermined analysis time period;

removing classified data from the at least one classified multidimensional operation data matrix so that the classified data remaining in the at least one classified multidimensional operation data matrix corresponds to a predetermined one of the aircraft and a predetermined one of the maintenance message for which the occurrence of the future maintenance message of the aircraft component is to be made, and generating an output of at least one partial dependency function on a user interface coupled to the aircraft maintenance controller, the output of the at least one partial dependency function being generated from the at least one classified multidimensional operation data matrix where the output of the at least one partial dependency function explains prediction of the occurrence of the future maintenance message by identifying at least which of the operational data is most frequently identified by the at least one maintenance message and operational ranges of the operational data most frequently identified by the at least one maintenance message.

C2. The method of paragraph C1, wherein the partial dependency function is a one dimensional partial dependency function whose output provides for visualizing trends for the classified data and ranges of values for the classified data that are indicative of the occurrence of the future maintenance message.

C3. The method of paragraph C1, wherein the partial dependency function is a two dimensional partial dependency function whose output provides for visualizing interactions between two dimensions of the classified data that are indicative of the occurrence of the future maintenance message.

C4. The method of paragraph C1, wherein the aircraft component is an auxiliary power unit.

C5. The method of paragraph C1, further comprising, with the aircraft maintenance controller:

obtaining a collection of existing data, from the database, corresponding to a respective one of at least one maintenance message, where the collection of existing data corresponds to a plurality of aircraft and includes training data that comprises the existing data from ail but one of the plurality of aircraft, and testing data that corresponds to the existing data of the one of the plurality of aircraft;

training the machine learning model with the training data so that the machine learning model indicates the future maintenance message will occur within the predetermined analysis time period; and validating accuracy of the training of the machine learning model with the testing data.

C6. The method of paragraph C1, further comprising classifying, with the aircraft maintenance controller, the operational data, in the first classification, by comparing a flight number in the at least one multidimensional maintenance message matrix for which a maintenance message exists with flight numbers in the at least one multidimensional operation data matrix to determine matching flight numbers for a predetermined maintenance message and whether the matching flight numbers are within a predetermined time period from each other.

C7. The method of paragraph C1, further comprising, with the aircraft maintenance controller, reducing a number of false positive failure indications in the second classification.

C8. The method of paragraph C7, wherein reducing the number of false positive failure indications includes grouping flights into positive blocks that are indicative of the occurrence of the future maintenance message within the predetermined analysis time period, and into negative blocks that are indicative that the future maintenance message will not occur within the predetermined analysis time period.

C9. The method of paragraph C8, further comprising:
grouping flights occurring within a predetermined blocking time period preceding a maintenance message occurrence into a positive block; and
grouping flights occurring after the maintenance message occurrence and flights occurring more than the predetermined blocking time period preceding the maintenance message occurrence into respective negative blocks.

C10. The method of paragraph C9, further comprising identifying an entire positive block as being indicative of the occurrence of the future maintenance message when a predetermined number of flights within the entire positive block are classified as being indicative of the occurrence of the future maintenance message in the second classification.

C11. The method of paragraph C1, further comprising dividing the respective negative blocks into sub-groups where a respective sub-group is identified as being a positive sub-group indicative of the occurrence of the future maintenance message when a predetermined number of flights within the respective sub-group are classified as being indicative of the occurrence of the future maintenance message in the second classification, otherwise the respective sub-group is identified as being a negative sub-group indicative that the future maintenance message will not occur within the predetermined analysis time period.

C12. The method of paragraph C11, further comprising, with the aircraft maintenance controller:
generating at least one receiver operating characteristic curve from the positive blocks, the positive sub-groups, and the negative sub-groups; and
predicting the occurrence of the future maintenance message for the aircraft component within the predetermined analysis time period based on the receiver operating curve.

C13. The method of paragraph C11, further comprising, with the aircraft maintenance controller:
generating at least one classification plot from the positive blocks, the positive sub-groups, and the negative sub-groups; and
predicting the occurrence of the future maintenance message for the aircraft component within the predetermined analysis time period, where each classification plot identifies how the classified data within a single flight is classified in the second classification.

C14. The method of paragraph C1, wherein the output of the at least one partial dependency function explains prediction of the occurrence of the future maintenance message so that maintainers of the aircraft can act upon the prediction of the occurrence of the future maintenance message with an understanding of the prediction of the occurrence of the future maintenance message.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 7, 8, and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 7, 8, and 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed (e.g., includes any suitable non-transitory computer program code and/or processors/electric circuitry), and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An aircraft component failure prediction apparatus comprising:
    a database coupled to at least one aircraft system, the database being configured to receive from the at least one aircraft system and store
        at least one multidimensional operation data matrix corresponding to operation of an aircraft component obtained from a plurality of aircraft, and
        at least one multidimensional maintenance message matrix corresponding to the operation of the aircraft component from the plurality of aircraft; and
    an aircraft maintenance controller coupled to the database, the aircraft maintenance controller being configured to
        classify operational data, in a first classification, of the at least one multidimensional operation data matrix as corresponding with at least one maintenance message to form at least one classified multidimensional operation data matrix including classified data;
        classify the classified data of the at least one classified multidimensional operation data matrix with a machine learning model, in a second classification, to predict an occurrence of a future maintenance message for the aircraft component within a predetermined analysis time period, where the aircraft maintenance controller preprocesses the at least one classified multidimensional operation data matrix to remove classification obscuring data from the at least one classified multidimensional operation data matrix, and
        generate an output of at least one partial dependency function on a user interface coupled to the aircraft maintenance controller, the output of the at least one partial dependency function being generated from the at least one classified multidimensional operation data matrix where the output of the at least one partial dependency function explains prediction of the occurrence of the future maintenance message by identifying at least which of the operational data is most frequently identified by the at least one maintenance message and operational ranges of the operational data most frequently identified by the at least one maintenance message.

2. The aircraft component failure prediction apparatus of claim 1, wherein the partial dependency function is a one dimensional partial dependency function whose output provides for visualizing trends for the classified data and ranges of values for the classified data that are indicative of the occurrence of the future maintenance message.

3. The aircraft component failure prediction apparatus of claim 1, wherein the partial dependency function is a two dimensional partial dependency function whose output provides for visualizing interactions between two dimensions of the classified data that are indicative of the occurrence of the future maintenance message.

4. The aircraft component failure prediction apparatus of claim 1, wherein the aircraft component is an auxiliary power unit.

5. The aircraft component failure prediction apparatus of claim 1, wherein the aircraft maintenance controller is further configured to:
    obtain a collection of existing data, from the database, corresponding to a respective one of at least one maintenance message, where the collection of existing data corresponds to a plurality of aircraft and includes training data that comprises the existing data from all but one of the plurality of aircraft, and testing data that corresponds to the existing data of the one of the plurality of aircraft;
    train the machine learning model with the training data so that the machine learning model indicates the future maintenance message will occur within the predetermined analysis time period; and
    validate accuracy of the training of the machine learning model with the testing data.

6. The aircraft component failure prediction apparatus of claim 1, wherein the aircraft maintenance controller is configured to classify the operational data, in the first classification, by comparing a flight number in the at least one multidimensional maintenance message matrix for which a maintenance message exists with flight numbers in the at least one multidimensional operation data matrix to determine matching flight numbers for a predetermined maintenance message and whether the matching flight numbers are within a predetermined time period from each other.

7. The aircraft component failure prediction apparatus of claim 6, wherein the aircraft maintenance controller is configured to preprocess the at least one classified multidimensional operation data matrix by removing classified data from the at least one classified multidimensional operation data matrix so that the classified data remaining in the at least one classified multidimensional operation data matrix corresponds to a predetermined one of the aircraft and a predetermined one of the maintenance message for which the prediction of the occurrence of the future maintenance message of the aircraft component is to be made.

8. The aircraft component failure prediction apparatus of claim 1, wherein the aircraft maintenance controller is further configured to reduce a number of false positive failure indications in the second classification.

9. A method for predicting aircraft component failure, the method comprising:
   receiving and storing, in a database coupled to at least one aircraft system, at least one multidimensional operation data matrix corresponding to operation of an aircraft component obtained from a plurality of aircraft, and at least one multidimensional maintenance message matrix corresponding to the operation of the aircraft component from the plurality of aircraft; and
   with an aircraft maintenance controller coupled to the database
      classifying operational data, in a first classification, of the at least one multidimensional operation data matrix as corresponding with at least one maintenance message to form at least one classified multidimensional operation data matrix including classified data;
      classifying the classified data of the at least one classified multidimensional operation data matrix with a machine learning model, in a second classification, to predict an occurrence of a future maintenance message for the aircraft component within a predetermined analysis time period, where the at least one classified multidimensional operation data matrix is preprocessed to remove classification obscuring data from the at least one multidimensional operation data matrix, and
      generating on a user interface coupled to the aircraft maintenance controller, a visualization that explains prediction of the occurrence of the future maintenance message by identifying at least which of the operational data is most frequently identified by the at least one maintenance message and operational ranges of the operational data most frequently identified by the at least one maintenance message.

10. The method of claim 9, further comprising, with the aircraft maintenance controller:
    obtaining a collection of existing data, from the database, corresponding to a respective one of at least one maintenance message, where the collection of existing data corresponds to a plurality of aircraft and includes training data that comprises the existing data from all but one of the plurality of aircraft, and testing data that corresponds to the existing data of the one of the plurality of aircraft;
    training the machine learning model with the training data so that the machine learning model indicates the future maintenance message will occur within the predetermined analysis time period; and
    validating accuracy of the training of the machine learning model with the testing data.

11. The method of claim 9, further comprising classifying, with the aircraft maintenance controller, the operational data, in the first classification, by comparing a flight number in the at least one multidimensional maintenance message matrix for which a maintenance message exists with flight numbers in the at least one multidimensional operation data matrix to determine matching flight numbers for a predetermined maintenance message and whether the matching flight numbers are within a predetermined time period from each other.

12. The method of claim 11, further comprising, with the aircraft maintenance controller, preprocessing the at least one classified multidimensional operation data matrix by removing classified data from the at least one classified multidimensional operation data matrix so that the classified data remaining in the at least one classified multidimensional operation data matrix corresponds to a predetermined one of the aircraft and a predetermined one of the maintenance message for which the prediction of the occurrence of the future maintenance message of the aircraft component is to be made.

13. The method of claim 9, further comprising, with the aircraft maintenance controller, reducing a number of false positive failure indications in the second classification.

14. The method of claim 13, wherein reducing the number of false positive failure indications includes grouping flights into positive blocks that are indicative of the occurrence of the future maintenance message within the predetermined analysis time period, and into negative blocks that are indicative that the future maintenance message will not occur within the predetermined analysis time period.

15. The method of claim 14, further comprising:
    grouping flights occurring within a predetermined blocking time period preceding a maintenance message occurrence into a positive block; and
    grouping flights occurring after the maintenance message occurrence and flights occurring more than the predetermined blocking time period preceding the maintenance message occurrence into respective negative blocks.

16. The method of claim 15, further comprising identifying an entire positive block as being indicative of the occurrence of the future maintenance message when a predetermined number of flights within the entire positive block are classified as being indicative of the occurrence of the future maintenance message in the second classification.

17. The method of claim 16, further comprising dividing the respective negative blocks into sub-groups where a respective sub-group is identified as being a positive sub-group indicative of the occurrence of the future maintenance message when a predetermined number of flights within the respective sub-group are classified as being indicative of the occurrence of the future maintenance message in the second classification, otherwise the respective sub-group is identified as being a negative sub-group indicative that the future maintenance message will not occur within the predetermined analysis time period.

18. A method for predicting aircraft component failure, the method comprising:
    receiving and storing, in a database coupled to at least one aircraft system, at least one multidimensional operation data matrix corresponding to operation of an aircraft component obtained from a plurality of aircraft, and at least one multidimensional maintenance message matrix corresponding to the operation of the aircraft component from the plurality of aircraft; and
    with an aircraft maintenance controller coupled to the database
      classifying operational data, in a first classification, of the at least one multidimensional operation data matrix as corresponding with at least one maintenance message to form at least one classified multidimensional operation data matrix including classified data;

classifying the classified data of the at least one classified multidimensional operation data matrix with a machine learning model, in a second classification, to predict an occurrence of a future maintenance message for the aircraft component within a predetermined analysis time period;

removing classified data from the at least one classified multidimensional operation data matrix so that the classified data remaining in the at least one classified multidimensional operation data matrix corresponds to a predetermined one of the aircraft and a predetermined one of the maintenance message for which the occurrence of the future maintenance message of the aircraft component is to be made, and generating an output of at least one partial dependency function on a user interface coupled to the aircraft maintenance controller, the output of the at least one partial dependency function being generated from the at least one classified multidimensional operation data matrix where the output of the at least one partial dependency function explains prediction of the occurrence of the future maintenance message by identifying at least which of the operational data is most frequently identified by the at least one maintenance message and operational ranges of the operational data most frequently identified by the at least one maintenance message.

19. The method of claim 18, further comprising, with the aircraft maintenance controller:

obtaining a collection of existing data, from the database, corresponding to a respective one of at least one maintenance message, where the collection of existing data corresponds to a plurality of aircraft and includes training data that comprises the existing data from all but one of the plurality of aircraft, and testing data that corresponds to the existing data of the one of the plurality of aircraft;

training the machine learning model with the training data so that the machine learning model indicates the future maintenance message will occur within the predetermined analysis time period; and validating accuracy of the training of the machine learning model with the testing data.

20. The method of claim 18, further comprising, with the aircraft maintenance controller, reducing a number of false positive failure indications in the second classification.

* * * * *